United States Patent [19]

Whittaker et al.

[11] Patent Number: 4,925,211
[45] Date of Patent: May 15, 1990

[54] RETRACTABLE BRACE FOR AMBULANCE ATTENDANTS

[76] Inventors: Justin P. Whittaker, 121 University Avenue Unit 100, Waterloo, Ontario, Canada, N2J 4J6; Paul H. Whittaker, 330 Northlake Drive, Waterloo, Ontario, Canada, N2V 1R1

[21] Appl. No.: 304,462
[22] Filed: Feb. 1, 1989
[51] Int. Cl.⁵ .............................................. B60R 22/24
[52] U.S. Cl. ..................................... 280/801; 280/748; 296/19
[58] Field of Search ............... 280/748, 801, 727, 753, 280/802, 32.5; 296/19

[56] References Cited

U.S. PATENT DOCUMENTS

| | | | |
|---|---|---|---|
| 3,811,701 | 5/1974 | Grime | 280/802 X |
| 4,251,100 | 2/1981 | Rolandelli | 296/63 |
| 4,405,171 | 9/1983 | Payne et al. | 296/19 |
| 4,563,023 | 1/1986 | Clarkson | 280/748 |
| 4,637,629 | 1/1987 | Cummings | 280/801 |

FOREIGN PATENT DOCUMENTS

| | | | |
|---|---|---|---|
| 979047 | 12/1975 | Canada | 280/753 |
| 2843772 | 4/1980 | Fed. Rep. of Germany | 280/802 |
| 56945 | 4/1983 | Japan | 280/753 |

Primary Examiner—David M. Mitchell
Assistant Examiner—Tamara L. Finlay
Attorney, Agent, or Firm—R. Craig Armstrong

[57] ABSTRACT

A retractable brace for an ambulance attendant for use in an ambulance is disclosed. A lockable scissors mechanism is used to move an anchoring platform between a fully extended substantially vertical position adjacent the attendant's work area for securing the ambulance attendant thereto, and a stowed fully retracted substantially vertical position against the side wall of the ambulance. The plate can be locked in a number of positions.

6 Claims, 4 Drawing Sheets

RETRACTABLE BRACE FOR AMBULANCE ATTENDANTS

BACKGROUND OF THE INVENTION

This invention relates to a retractable brace for ambulance attendants and the like.

Ambulance attendants are frequently called on to perform CPR or other paramedical activities in moving ambulances. With CPR in particular, the attendant cannot work effectively and provide effective CPR unless properly braced. There is thus a need for a brace to permit the ambulance attendant to carry out his duties in a safe and effective manner.

There have been attempts in the prior art to provide suitable means for anchoring the ambulance attendant. Examples are seen in U.S. Pat. Nos. 4,251,100 and 4,563,023, for example.

There remains a need, however, for an effective and efficient brace to lock the attendant into a position where he or she can work effectively on the patient without being bounced around the ambulance as it hits bumps or goes around corners.

The brace should also be retractable and stowable in such a fashion that it is out of the way and occupies a minimum of space when not in use. For many types of ambulances, this means that the brace should be stowable against a side wall of the ambulance.

SUMMARY OF THE INVENTION

It is an object of the invention to provide an effective and efficient brace suitable for use in ambulances and the like.

Thus in accordance with the present invention there is provided a retractable brace for an ambulance attendant for use in an ambulance, in which a plate is moveable between a fully extended substantially vertical position adjacent the attendant's work area for securing the ambulance attendant thereto, and a stowed fully retracted substantially vertical position against the side wall of the ambulance. Means are provided for locking the plate in at least the extended and the stowed positions.

In the preferred embodiment, the plate is moveable by virtue of a scissors mechanism, as described in greater detail herein. The plate may be locked in place at a number of locations.

Though the primary intended application for the invention is in ambulances, it should be appreciated that the invention may have applications in other vehicles and for persons other than ambulance attendants.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The preferred embodiment of the invention involves what is essentially an "ironing board" type of mechanism, i.e. a scissors arrangement, mountable on the side wall of an ambulance to carry a foam-padded brace plate between a stowed position against the ambulance wall and a position extended towards the patient location. To the brace plate assembly is attached a seat belt or other harness into which the ambulance attendant straps himself or herself. The brace plate is locked into position via a locking mechanism handle, which simply relies on friction at the scissors joint.

Figure 4:
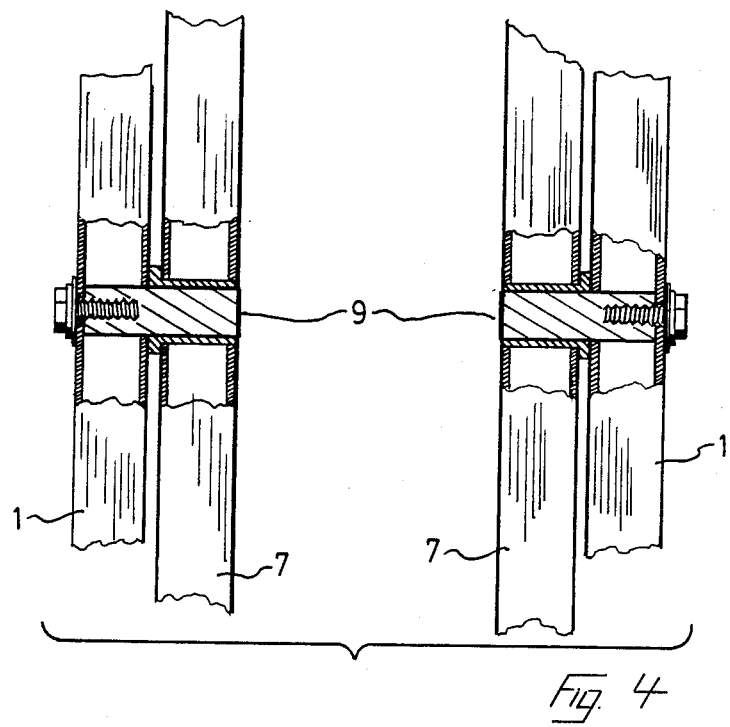
FIG. 4 is a view showing the scissors joint.
Figure 5:
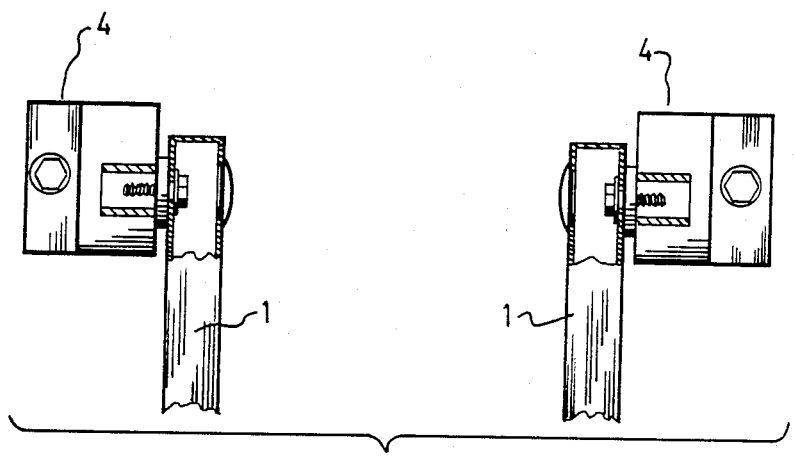
FIG. 5 is a view showing the attachment of the brace to an ambulance bench.

The scissors mechanism includes a first pair of rectangular tubes 1, pivotally connected at one end to the ambulance bench 3 via brackets 4, and pivotally connected at the other end to the top of brace plate 5 via brackets 6. A second pair of rectangular tubes 7 are adjustably connected at one end near the lower portion of the brace plate, as will be described in greater detail below. The "free" ends of the tubes 7 are connected to a crossbar 10. The crossbar 10 has a hole containing a bushing 11 to permit the crossbar to slide up and down the rail 12 which passes through the hole. The rail is attached to the side wall 2 of the ambulance near the roof via brackets 13. The tubes 1 and 7 are pivotally connected to each other at pivot points 9, seen best in FIG. 4.

The brace plate 5 preferably has a foam pad 14 bonded to its outer face.

Figure 1:
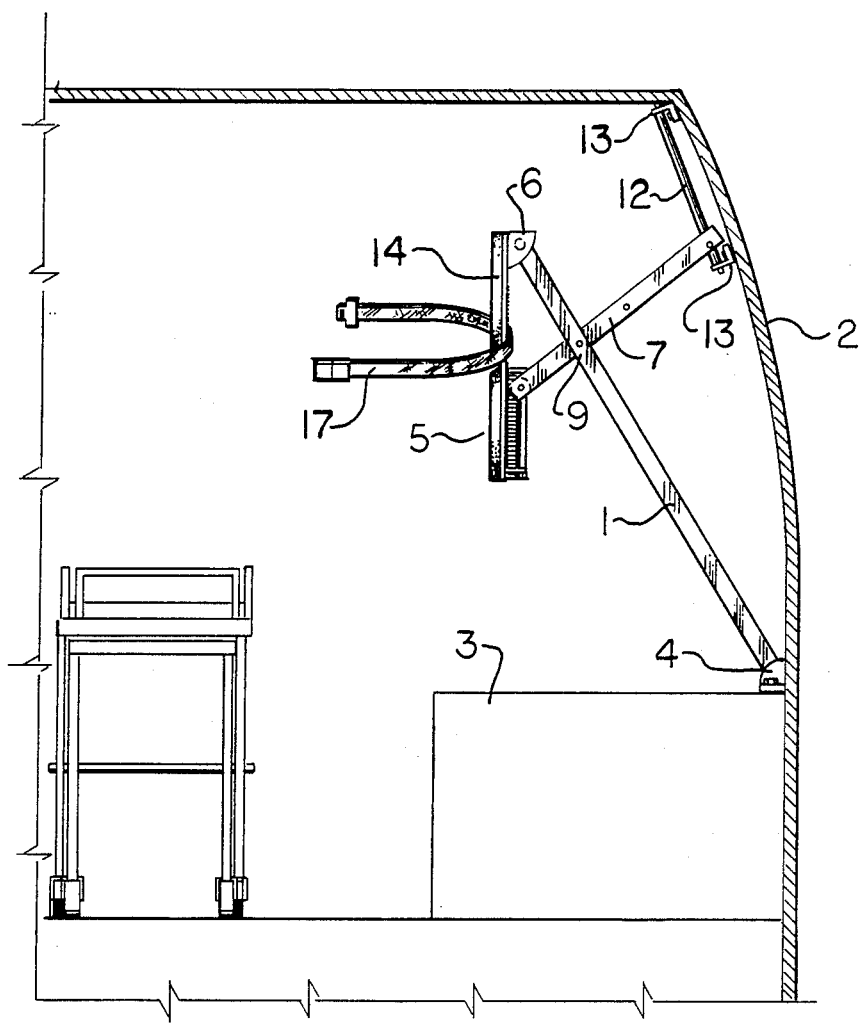
FIG. 1 is a elevation view showing the interior of a typical ambulance, looking forward.
Figure 2:
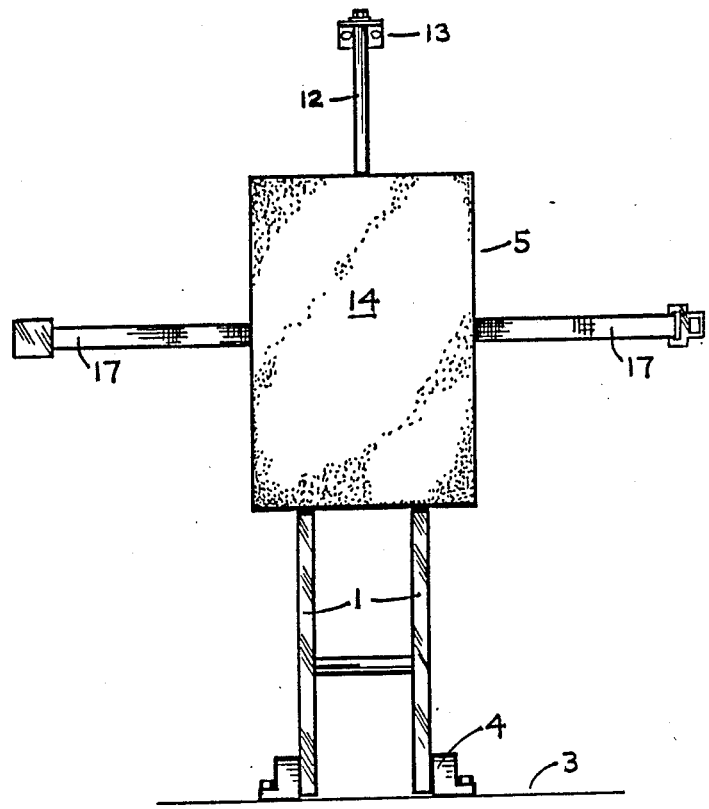
FIG. 2 is a front view of the brace.

A conventional seat belt 17 or other suitable means is used to secure the attendant to the plate. The seat belt may be conveniently passed behind the plate between the scissors members, as seen in FIG. 1. On the inside back of seat belt, VELCRO (trademark) hook and pile strips (not shown) may be provided to fasten to corresponding strips (not shown) which may be arranged vertically on the side or back of the plate. This arrangement permits the seat belt to be positioned to accommodate any size of ambulance attendant. The attendant merely slides the seat belt to the desired height in the gaps, and then wraps the seat belt around to the front, which action causes the VELCRO strips to mate. Any other suitable means of locating the seat belt may of course be used, such as loops or rings, or such means may be omitted entirely.

Figure 3:
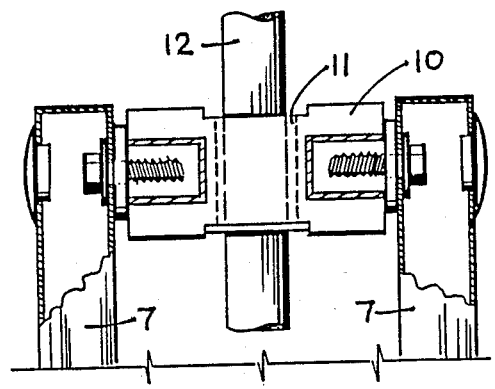
FIG. 3 is a view showing the attachment of the brace to an upper rail.
Figure 6:
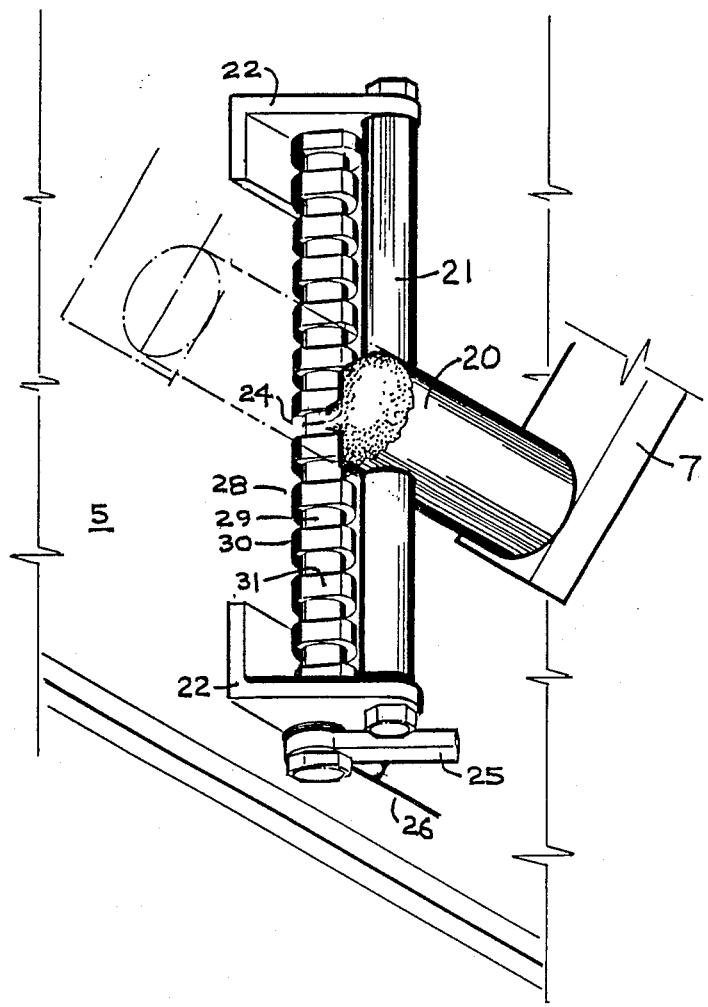
FIG. 6 is a view showing the locking mechanism.

Referring now to FIG. 6, the preferred locking mechanism will be described in greater detail. A crosspiece 20 is connected between the ends of the tubes 7, the crosspiece being mounted between the tubes 7 in a manner similar to that shown in FIG. 3 for the other end of the tubes 7. The crosspiece has a hole so that it rides up and down on a rail 21. The rail is mounted on brackets 22 fastened to the back of the plate 5. The crosspiece has a tongue 24 which projects towards the back of the plate. A release handle 25, forced towards the locked position by a spring 26, can be operated by reaching behind the plate. Operating the release handle produces rotation of the camshaft 28, which is also mounted between the brackets 22. The valleys 29 between the cams 30 ordinarily trap the tongue, so that the crosspiece is prevented from moving along the rail. However, rotation of the camshaft via the release handle brings flat portions 31 into position opposite the tongue, thereby releasing the tongue and permitting the crosspiece to move up and down the rail. Releasing the release handle causes the camshaft to rotate back under the influence of the spring, to capture the tongue and lock the assembly.

As an alternative locking means, a locking handle could be used, with the locking handle configured to force the scissors members together at the pivot points 9 to produce enough friction to lock the assembly in place.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, the locking mechanism described above could be replaced by other locking means, such as a friction lock at the joint between the scissors members, or any other suitable locking means at any suitable location.

The method of mounting could obviously be varied to suit different ambulance configurations from the one illustrated in the drawings.

The essence of the invention lies in the use of a lockable scissors mechanism to move an anchoring platform or brace plate between an extended and a stowed position, regardless of the details of how that is accomplished.

The anchoring platform or brace plate is arranged to be substantially vertical, but it is to be understood that it clearly makes no difference to the invention if the plate is in fact 10 or 20 or even 30 degrees from the vertical, as long as it is capable of providing suitable support for the attendant.

What is claimed as the invention is:

1. A retractable brace for an ambulance attendant for use in an ambulance, comprising a plate having two sides and upper and lower ends, said plate being moveable between a fully extended substantially vertical position adjacent the attendant's work area, and a stowed fully retracted position against the side wall of the ambulance, further comprising means for locking the plate in at least said extended and said stowed positions, and means for securing the ambulance attendant to said plate.

2. A brace as recited in claim 1, in which said plate is moveable between said extended and said stowed positions by virtue of a scissors mechanism, said mechanism comprising:
   at least one first member having two ends, one end being pivotally connected near one end of the plate and defining an acute angle with respect to the plate, and the other end being pivotally connectable to the ambulance;
   at least one second member having two ends, said second member being pivotally connected to a central portion of said first member and moveably connected near the other end of the plate from said first member, the end of said second member remote from said plate being moveably connectable to the ambulance, said second member being lockable in at least two fixed positions with respect to said first member, said two positions corresponding to said fully extended position and said stowed position of said plate.

3. A brace as recited in claim 2, in which each said first member is pivotally connected near the upper end of the plate.

4. A brace as recited in claim 2, in which each said second member is lockable by virtue of the end thereof adjacent said plate being moveable along a rail attached to said plate, said brace including means for securing said member on said rail.

5. A brace as recited in claim 4, in which said second member is securable to said rail at a number of positions, whereby said plate may be positioned at a corresponding number of locations.

6. A brace as recited in claim 5, in which said second member is securable by virtue of manual rotation of a slotted camshaft into and out of engagement with a tongued member connected to said second member.

* * * * *